Nov. 3, 1925.

P. N. LANDINE

COWL VENTILATOR

Filed Sept. 9, 1922

1,559,891

INVENTOR
Peter N. Landine
BY Mitchell Brothers.
ATTORNEYS.

Patented Nov. 3, 1925.

1,559,891

UNITED STATES PATENT OFFICE.

PETER N. LANDINE, OF MILFORD, CONNECTICUT.

COWL VENTILATOR.

Application filed September 9, 1922. Serial No. 587,190.

*To all whom it may concern:*

Be it known that I, PETER N. LANDINE, a citizen of the United States of America, residing at Milford, Connecticut, have invented a new and useful Cowl Ventilator, of which the following is a specification.

My invention relates to a ventilator, and is particularly adapted for, and will be described as, an automobile cowl ventilator.

It is an object of my invention to provide a ventilator for attachment to a cowl in which the joint made with the sheet metal covering of the cowl will be smooth and unmarred.

It is a further object to provide a ventilator which may be securely attached to the cowl without the use of rivets.

It is a further object to provide operating means for a ventilator, which will be operable in a number of positions, whereby the manual operating means may be located at a convenient point on the dash or other part.

Briefly stated, a preferred form of one feature of my invention includes a frame member which is positioned adjacent the ventilator opening in the sheet metal covering of the cowl. The edge of the metal adjacent the aperture is lapped about the frame, and a second frame abuts the lapped-over end and is secured to the first-mentioned frame so that the edge of the sheet metal covering is sandwiched in between and held by the two frames. A ventilator cover is supplied, and is preferably pivoted to one of the frame members, and provision is made for actuating the ventilator cover.

A preferred form of a second feature of my invention, namely, a novel form of adjustable actuating means, includes a bar secured to the ventilator cover and extending at least part way across the cover. An actuating member, which may be in the form of a push rod, is mounted for sliding engagement along the bar, whereby the push rod or other operating device may actuate the ventilator cover from various positions, so that it is possible to locate the hand-operating member at a convenient point on the dash or other part.

The drawings forming part of this specification show, for illustrative purposes only, a preferred form of my invention. In said drawings—

Figure 1:
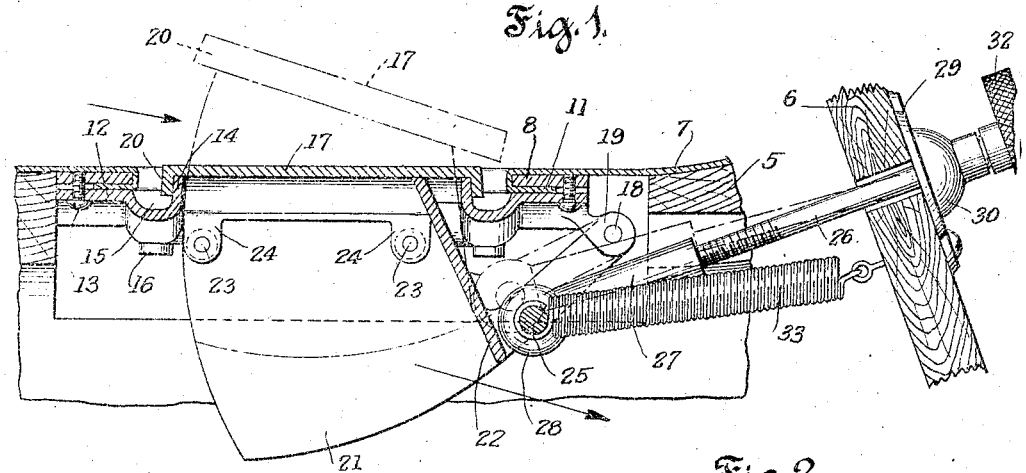
Figure 1 is a sectional view of a cowl ventilator, illustrating features of my invention and showing only sufficient of the vehicle body to permit a clear understanding of the invention.
Figure 2:
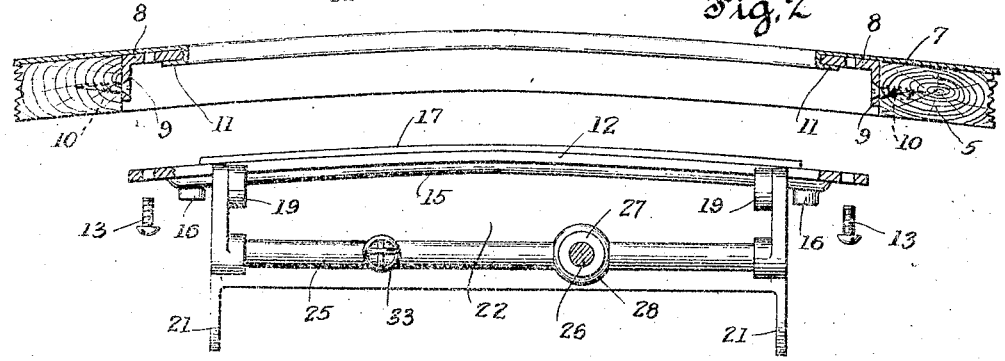
Fig. 2 is a sectional view, taken in a plane at right angles to that of Fig. 1, parts being shown relatively separated.
Figure 3:
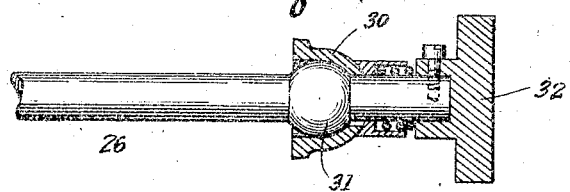
Fig. 3 is a fragmentary sectional view showing one form of push rod or operating member.

In said drawings, 5 indicates conventionally the cowl of an automobile, while 6 indicates a fragment of the dash. The cowl is formed of or covered with sheet metal 7, as is usual in motor vehicles, and a ventilator opening is provided in the cover 7 and in the wooden part of the cowl (when such part is used).

A frame 8, having flanges 9—9 at opposite sides, is positioned adjacent the ventilator opening and may be secured to the body portion 5 by means of screw 10—10 passing through the flanges. The aperture in the covering 7 is slightly smaller than the opening of the frame 8, and the free edge of the metal defining the aperture is lapped over the frame 8, as indicated at 11—11, so as to form a perfectly smooth and finished ventilator opening about the frame.

A second frame 12 is secured to the frame 8, as by means of screws 13—13 passing through suitable apertures in the frame 12 and taking into threaded apertures in the frame 8. The frame 12 abuts against the inturned edge of the cowl covering, and the inturned edge will therefore be sandwiched in between and securely held by the two frames when the latter are secured together.

The frame 12 preferably has a continuous upstanding lip 14, which serves as a seat for the ventilator cover and defines one side of a gutter or drain 15, which may discharge into suitable drain pipes (not shown) connected to the drain bosses 16.

A ventilator cover member 17 may be pivotally mounted at 18 to lugs 19—19 extending from the frame 12. The cover proper may have a downturned flange 20, for overlapping the upstanding lip 14 and providing a tight joint. Cheek plates 21—21 and a rear deflector plate 22 may be secured to the under side of the top cover, by means of screws 23—23 extending into lugs 24—24 on the top cover, and arms extending from the plates and pivoted to the lugs 19, at 18, serve to pivotally support the cover 17.

A bar 25 is mounted on and extends between the cheek plates 21—21. Suitable operating means, such as a push rod 26, cooperates with the bar 25 and, in the form shown, the rod 26 is in screw-threaded engagement with a sleeve 27 carrying an enlargement 28, which surrounds and is slidably mounted on the bar 25. The push rod 26 is preferably fixed against longitudinal movement, but is rotatably mounted on the dash 6, and in the present disclosure the dash is provided with a suitable aperture 29 through which the rod 26 extends, and on the front of the dash is mounted a plate 30 for receiving a ball 31 on the rod 26. A knob or handle 32 is fixed at the inner end of the rod 26, whereby the latter may be rotated. If desired, a spring 33 may be secured to the bar 25 and to the dash, for constantly urging the ventilator cover toward the closed position.

It will be obvious that, with the rod 26 fixed against longitudinal movement, rotation of the rod will cause the sleeve 27, enlargement 28 and, through these elements, the bar 25, to move. When the bar 25 is pushed toward the left as viewed in Fig. 1, the ventilator cover is opened, and conversely, when the rod 26 is rotated so as to move the bar 25 to the right, the ventilator cover will be closed. The enlargement or boss 28 is slidably mounted on the bar 26, so that it may be slid along the bar and, no matter where the boss is situated upon the bar 25, the cover member may be operated.

It is apparent that with the arrangement described the cowl ventilator control on the dash or other member may be situated at any convenient point wich may be available, and that, if the location of the control is to be changed, no change is necessary in the ventilator proper nor its mounting, since the boss 28 may be slid along on the bar 25 and, regardless of the position of the boss on the bar, the ventilator cover may be operated.

The cowl ventilator above described may be readily and securely attached to the cowl covering without the use of rivets; the edge of the finished ventilator aperture will be smooth, and the cover and frames may be arranged to fit flush.

It will likewise be observed that I have provided novel means whereby the ventilator cover may be operated from various points along the cover member, and that this feature renders it convenient to locate the ventilator control at any desirable point, and furthermore, great care need not be exercised in locating the control on the dash, since the ventilator cover may be actuated from any practicable point.

While I have described a preferred form of my invention, I wish it understood that various features of my invention may be changed without departing from the spirit of my invention as defined in the appended claims.

I claim:

1. In a cowl ventilator, a frame, cover means pivotally mounted on said frame, a bar extending transversely of said cover means, and operating means slidably mounted on said bar whereby the cover means may be operated from any position on said bar.

2. In a cowl ventilator, a frame, a ventilator cover pivotally mounted on said frame, a bar extending along said cover member substantially parallel to said pivotal mounting, and operating means slidable along said bar whereby the cover member may be operated from any point along said bar.

3. In a cowl ventilator, a pivotally mounted ventilator cover, operating means connected to said ventilator cover and adjustable to various positions transversely of said cover whereby the operating means may move the cover in any adjusted position.

4. In a cowl ventilator, and in combination with a vehicle having a cowl and a dash, a frame, a ventilator cover pivotally mounted on said frame, a bar extending transversely of said ventilator cover, and a push rod slidably mounted on said bar and operable from the dash.

5. A cowl ventilator comprising a frame providing an opening, a closure for said opening, a pair of arms secured to the underside of said closure one adjacent each end thereof intermediate the lateral edges and extending downwardly and inwardly through said opening, said arms being pivotally connected at their upper rear ends to the underside of said frame, a rod extending longitudinally of said closure and connected at its ends to the lower rear ends of said arms, an operating handle, and means connecting said operating handle to said rod, said means being adjustable along said rod whereby said operating handle may be located at any point between said arms.

6. A cowl ventilator comprising a frame providing an opening, a closure for said opening, a pair of arms secured to the under side of said closure one adjacent each end thereof intermediate the lateral edges and extending downwardly and inwardly through said opening, said arms being pivotally connected at their upper rear ends to the underside of said frame, a rod extending longitudinally of said closure and connected at its ends to the lower rear ends of said arms, an operating handle in the form of a rod extending transversely to said first mentioned rod and having the forward end thereof threaded, and a block slidably mounted on said first-mentioned rod and having a threaded bore to receive said operating handle.

7. A cowl ventilator comprising a frame providing an opening, a closure for said opening hinged on said frame, a part secured to the under side of said closure and disposed parallel to the axis of said hinge and extending substantially the entire length of said closure, an operating handle, and means connecting said operating handle to said part whereby said handle may be set at any point along the length of said closure.

8. A cowl ventilator comprising a frame providing an opening, a closure for said opening hinged on said frame, a rod supported on the under side of said closure and extending longitudinally thereof substantially the entire length of said closure, an operating handle in the form of a rod extending transversely to said first-mentioned rod and having the forward end thereof threaded, a block slidably mounted on said first-mentioned rod and having a threaded bore adapted to receive said threaded operating handle.

9. In a cowl ventilator, a movable ventilator cover, means on said cover for receiving an operating member, and an operating member adapted to be connected to said means at various positions on said ventilator cover.

10. In a cowl ventilator, a pivotally mounted ventilator cover, means on said ventilator cover and extending therealong substantially parallel to the axis of the pivotal mounting, and an operating member adapted to be connected to said means whereby said operating member may be positioned at various points on a dash and may operate said ventilator cover from such various positions.

PETER N. LANDINE.